No. 791,124. PATENTED MAY 30, 1905.
G. BAEHR.
CONTROLLER FOR ELECTRIC MOTORS.
APPLICATION FILED FEB. 10, 1905.

WITNESSES
Warren W. Swartz
Richard D. Little

INVENTOR
George Baehr
by Lawrence Byrnes
his attys

No. 791,124.

Patented May 30, 1905.

UNITED STATES PATENT OFFICE.

GEORGE BAEHR, OF McKEESPORT, PENNSYLVANIA, ASSIGNOR TO NATIONAL TUBE COMPANY, OF PITTSBURG, PENNSYLVANIA, A CORPORATION OF NEW JERSEY.

CONTROLLER FOR ELECTRIC MOTORS.

SPECIFICATION forming part of Letters Patent No. 791,124, dated May 30, 1905.

Application filed February 10, 1905. Serial No. 245,088.

*To all whom it may concern:*

Be it known that I, GEORGE BAEHR, of McKeesport, Allegheny county, Pennsylvania, have invented a new and useful Controller for Electric Motors, of which the following is a full, clear, and exact description, reference being had to the accompanying drawings, forming part of this specification, in which—

Figure 1:
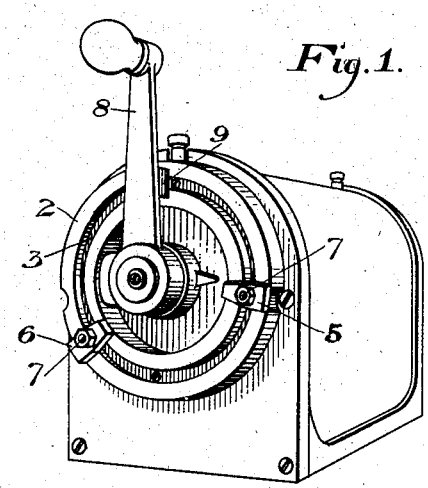
Figure 2:
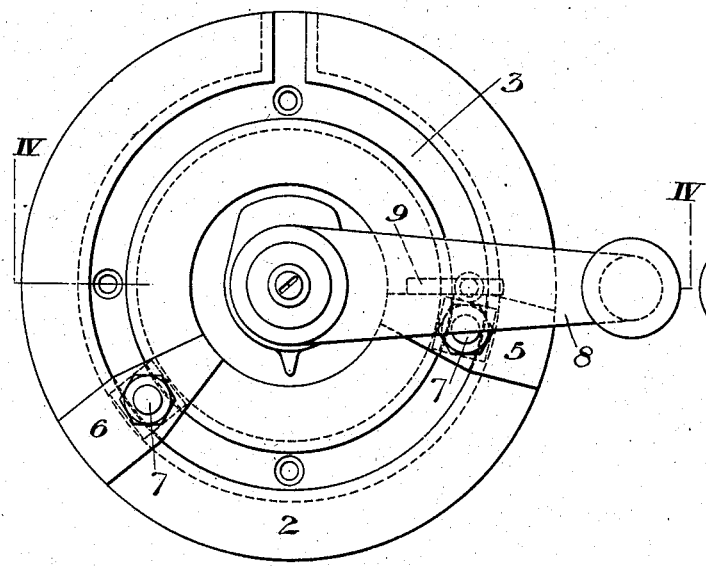
Figure 3:
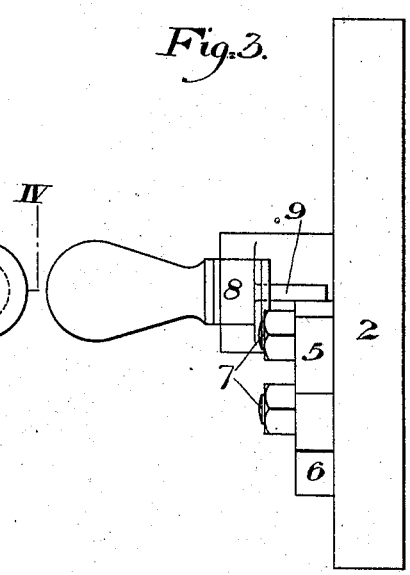
Figure 4:
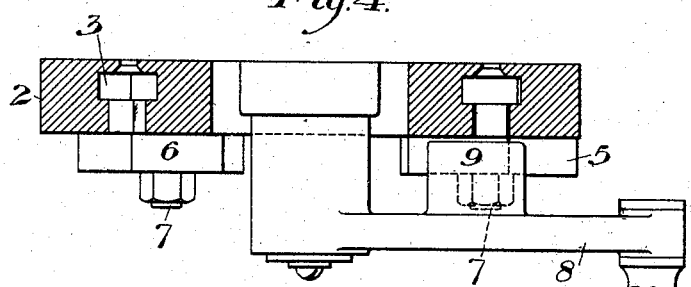

Figure 1 is a perspective view of a controller constructed in accordance with my invention. Fig. 2 is an elevation of the controller. Fig. 3 is a side view, and Fig. 4 is a horizontal section on the line IV IV of Fig. 2.

When electric motors are employed for driving machinery, such as the threading-machines used for threading pipes and couplings, it is necessary frequently to move the controller-handle from off position to on position, and the working position of the controller-handle must also be varied to suit the diameter of the pipe which is being threaded, for it is necessary to rotate the dies on the pipe at a nearly-constant surface speed. With the controllers heretofore commonly used this introduces a serious difficulty, because it is hard for the workman in the hurried operations of his work to adjust the controller-handle to the proper position, and where especial attention is required by him in doing this it detracts his attention from the other portions of his work.

I have devised an adjustable stop for use with standard controllers of various styles and makes which may be set to any desired forward or reverse speed-point within the limits of the controller, so that the operator is enabled simply by moving the handle until it comes to a stop to bring it to proper position for the required speed without having to observe the extent to which he has moved it.

The main function of the adjustable stop is to enable the operator to easily and quickly adjust the stops on the controller so the machine will run at the rate of speed desired in threading the size of pipe being cut in the machine and to permit the machine being repeatedly stopped and brought to such speed by simply moving the controller-handle until it is in contact with the adjusted stop. The machine is made to thread a number of sizes— say from one-and-one-half-inch to four-inch pipe—at a uniform cutting speed of about twenty feet per minute. Hence it is necessary to run the machine faster to thread one-and-one-half-inch pipe than four-inch pipe, and by my adjustable stop the operator can quickly set the stop on the controller, so as to give the machine a uniform cutting speed of about twenty feet per minute for all sizes of pipe that the machine will thread. If the machine is operated at too high a speed, the threading-dies will be spoiled, and if at too slow a speed fewer pipe will be threaded, so that it is important to provide means for the operator to adjust the speed of the machine quickly and correctly.

By the use of my improved stop loss of time in the operation of the machine, caused by the setting of the controller to the required speed, is avoided and the output of the machine is greatly increased.

The preferable construction of my device is shown in the drawings, in which the face-plate 2 of the controller is provided with a surface groove or guideway 3, which is preferably undercut or of T form, as shown in Fig. 4, and over this groove are mounted stop-pieces 5 and 6, having T-head bolts 7, the heads of which fit in the groove. These stops can be moved along the groove and adjusted in proper position therein to constitute the limits for the forward and reverse positions of the handle 8, and by simply loosening the nuts of the bolts the stops may be adjusted readily, as desired. When thus adjusted, the operator in starting the motor moves the handle 8 until the stop 9 thereon comes into contact with the adjustable stop 5 or 6, accordingly as he desires the motor to move forward or back, and he does not need to observe the extent of the motion of the handle further than to bring the stops 9 and 5 or 6 into contact.

If desired, I may use a stop only for the forward position of the controller; but I prefer to use both stops, as it provides for the running of the machine in either direction, and they can be easily adjusted and set in order to provide for the different speeds desired in the operation of the machine.

The form of the stop and the shape of the guide in which it is adjustable on the controller may be modified in many ways, since

What I claim is—

1. A controller for electric motors, having in combination with the handle a stop provided with a fastening device mounted in a groove on the face of the controller.

2. A controller for electric motors, having in combination with the handle a stop provided with a fastening device mounted in a T-shape groove on the face of the controller.

3. A controller for electric motors, having in combination with the handle, adjustable stops adapted to limit the motion of the handle in forward and reverse positions.

In testimony whereof I have hereunto set my hand.

GEORGE BAEHR.

Witnesses:
   COHRINNE A. BROOKS,
   JOHN T. HECKMAN.